(12) United States Patent
Jiang

(10) Patent No.: US 12,045,106 B2
(45) Date of Patent: Jul. 23, 2024

(54) PROCESSING UNIT RESET BY A VIRTUAL FUNCTION BYPASSING A HOST DRIVER

(71) Applicant: ATI TECHNOLOGIES ULC, Markham (CA)

(72) Inventor: Yinan Jiang, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 217 days.

(21) Appl. No.: 17/564,139

(22) Filed: Dec. 28, 2021

(65) Prior Publication Data

US 2023/0205287 A1 Jun. 29, 2023

(51) Int. Cl.
*G06F 1/24* (2006.01)
*G06F 9/455* (2018.01)
*G06F 11/14* (2006.01)

(52) U.S. Cl.
CPC ............ *G06F 1/24* (2013.01); *G06F 9/45558* (2013.01); *G06F 11/1484* (2013.01); *G06F 2009/45575* (2013.01); *G06F 2201/815* (2013.01)

(58) Field of Classification Search
CPC . G06F 2009/45575; G06F 2009/45591; G06F 1/24; G06F 1/30
See application file for complete search history.

(56) References Cited

U.S. PATENT DOCUMENTS

| | | | |
|---|---|---|---|
| 2009/0133028 A1* | 5/2009 | Brown ................ | G06F 9/45558 718/104 |
| 2011/0179414 A1 | 7/2011 | Goggin et al. | |
| 2012/0192178 A1* | 7/2012 | Brownlow .......... | G06F 9/45558 718/1 |
| 2014/0380028 A1* | 12/2014 | Cheng ................ | G06F 9/45533 713/1 |
| 2019/0018699 A1 | 1/2019 | Asaro et al. | |
| 2021/0200618 A1* | 7/2021 | Magro ................. | G06F 11/141 |

OTHER PUBLICATIONS

International Search Report and Written Opinion issued in Application No. PCT/IB2022/062738, mailed Mar. 20, 2023, 9 pages.

* cited by examiner

*Primary Examiner* — Raymond N Phan

(57) ABSTRACT

A virtual function (VF) of a virtual machine is enabled to directly reset a processing portion of a processing unit. The VF initiates the reset of the processing portion directly and a host driver associated with the processing unit is bypassed during the reset process. By allowing for a direct reset of the processing portion, a processing system reduces the overhead associated with the reset process, enhances system security, and improves overall VM and hardware isolation at the processing system.

20 Claims, 3 Drawing Sheets

PROCESSING UNIT RESET BY A VIRTUAL FUNCTION BYPASSING A HOST DRIVER

BACKGROUND

To support efficient use of processing resources, some processing systems support virtualization, wherein multiple independent processing environments, referred to as virtual machines (VMs) use the processing resources of the processing systems. In some cases, a processing system employs one or more virtualization layers that abstract the hardware resources of the processing system, allowing the VMs to use device drivers, application program interfaces (APIs), operating systems, and other software that has been designed and implemented for non-virtualized environments. For example, in some cases a processing system includes a hypervisor that provides an interface between the hardware resources of the processing system and the executing VMs. The hypervisor employs a host device driver that interfaces with hardware resources, and the hypervisor translates communications between a local device driver of the VM and the host driver. The hypervisor thus allows the hardware resources of the processing system to appear to the VM as dedicated local hardware resources, allowing the VM to use a standard device driver and other software designed for use with local, dedicated hardware. However, for some operations, in some processing environments, the additional processing required to virtualize the hardware resources results in processing inefficiencies.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
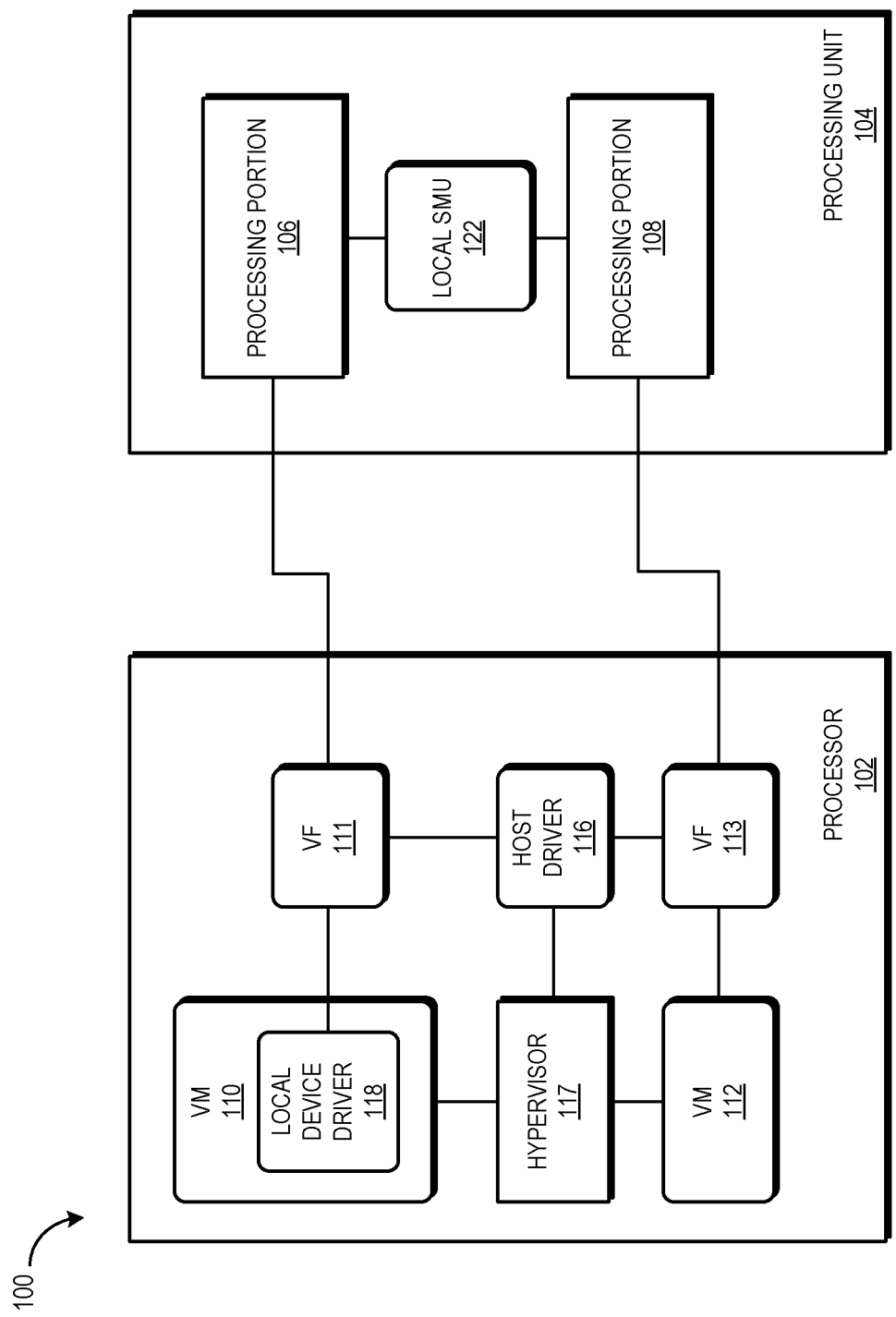
FIG. 1 is a block diagram of a processing system that supports direct reset of a processing portion of a processing unit by a virtual function in accordance with some embodiments.

FIGS. 1-4 illustrate techniques for enabling a virtual function (VF) of a virtual machine to directly reset a processing portion of a processing unit. The VF initiates the reset of the processing portion directly and a host driver associated with the processing unit is bypassed during the reset process. By allowing for a direct reset of the processing portion, a processing system reduces the overhead associated with the reset process, enhances system security, and improves overall VM and hardware isolation at the processing system.

To illustrate, in some cases a processing system supports virtualization of hardware resources via partitioning of a hardware resource, such as a graphics processing unit (GPU). The hardware resource is assigned a physical function (PF) that manages operations at the hardware resource. Each VM executing at the processing system is assigned a different VF, and the PF and other virtualization entities at the processing system manage provision of the hardware resource to the VMs via the respective VFs. That is, a VF provides a way for the corresponding VM to interface with the PF, and to control the portion of the hardware resource assigned to the VM.

In some conventional processing systems, the hardware resource is temporally partitioned among the different VFs. Thus, each VF is assigned a portion, also referred to as a "slot", of a given unit of time, and each VF is allowed to control the hardware resource during its assigned time slots. In some situations, an error for a particular VF will occur at the hardware resource, such as the hardware resource stalling (or "hanging") when performing operations on behalf of the VF. In response to such errors, the VF typically seeks to reset the hardware resource. However, such a reset, in many cases, affects the operations executed by the hardware resource on behalf of other VFs. Accordingly, for a temporally-partitioned hardware resource, the VF is required to work with a host driver in order to reset the hardware resource. In particular, the guest driver interfacing with VF is required to send an interrupt to the host driver to request the reset, and the host driver identifies which VF sent the request, and what temporal partition is associated with that VF. The host driver then communicates with A hypervisor or the firmware of a system management unit (SMU) of the host device to reset the hardware resource (this communication process is referred to as a "handshake" between the host driver and the SMU firmware). During the reset, other VF will be unable to run on the host device. After the hardware resource reset is complete, the host driver notifies the guest driver associated with the VF that the reset is complete.

In contrast to temporally-partitioned hardware resources, in some embodiments a hardware resource is spatially partitioned, so that different processing portions of the hardware resource are assigned to different VFs (and therefore to different corresponding VMs). For example, in some embodiments a GPU includes a plurality of rendering engines, and each rendering engine is implemented by different, independent hardware, such as a different GPU chiplet. When a hardware resource is spatially partitioned, in at least some cases resetting one processing portion of the resource does not affect operations at the other processing portions. Accordingly, using the techniques herein, a VF that controls part of a spatially-partitioned hardware resource is able to reset its assigned processing portion directly, bypassing the host device driver and simplifying the reset process.

In addition, because the host device driver is bypassed, security at the processing system is enhanced. To illustrate, in a conventional system where all reset requests by a VF are sent to the host driver, a malicious driver or application is able to send many reset requests. The servicing of these multiple requests consumes the bandwidth of the corresponding hardware resource, thus impacting the quality of service for all the VMs executing at the processing system. Using the techniques described herein, the VF resets its assigned portion of the hardware resource and bypasses the host driver. Thus, the issuing of multiple reset requests by a VF impacts only the VM associated with that VF and does not impact the quality of service for other VMs.

FIG. 1 illustrates a block diagram of a processing system 100 that is configured to supports direct reset of a processing portion of a processing unit by a virtual function in accordance with some embodiments. The example of FIG. 1 is discussed with respect to some example embodiments wherein the processing is a GPU. However, it will be appreciated that, in other embodiments, the techniques described herein are applied to other types of processing units, such as vector processing units, parallel processing units, machine learning processing units, artificial intelligence processing units, and the like.

The processing system 100 is generally configured to execute sets of instructions, such as virtual machines (VMs), operating systems, applications, and the like. The processing system thereby carries out specified tasks, as indicated by the sets of instructions, on behalf of an electronic device. Accordingly, in different embodiments the processing system 100 is incorporated into one of a variety of electronic devices, such as a server, a desktop computer, a laptop computer, a game console, a tablet, a smartphone, and the like. To support execution of the sets of instructions, the processing system 100 includes a processor 102 and a processing unit 104. It will be appreciated that although the processor 102 and the processing unit 104 are illustrated as separate blocks, in some embodiments one or more of the processor 102 and the processing unit 104 are collectively incorporated in a single integrated circuit or integrated circuit package. For example, in some embodiments the processor 102 and the processing unit 104 are formed from different semiconductor dies, and all of the dies are incorporated in a multi-chip integrated circuit.

The processor 102 is a general-purpose processor and is generally configured to execute sets of general purpose instructions. Accordingly, in some embodiments the processor 102 is a central processing unit (CPU) having one or more processor cores (not shown) each including one or more instruction pipelines configured to execute program threads, representing portions of the sets of instructions, in a pipelined fashion. In the course of executing the program threads, the instruction pipelines generate graphics commands (e.g., draw commands), representing requests for specified graphics operations.

The processing unit 104 is a processing unit configured to receive commands to execute a particular class or type of operations and is further configured to execute the corresponding operations indicated by the commands. For example, in some embodiments the processing unit 104 is a GPU configured to execute drawing operations, texture operations, shader operations, tessellation operations, vector processing operations, and the like. The processing unit 104 includes a plurality of processing portions, including processing portion 106 and processing portion 108. In some embodiments, the processing unit 104 includes additional processing portions not illustrated at FIG. 1. As used herein, a processing portion of a processing unit is a set of circuits that collectively execute processing operations independently, or substantially independently, of the other processing portions. For example, in some embodiments the processing unit 104 is a GPU, and each of the processing portions 106 and 108 implements a rendering engine, with each rendering engine operating substantially independently of the other to execute graphics operations based on received commands.

The processing unit 104 also includes one or more local system management units (SMUs), such as SMU 122. The SMU 122 is a hardware module, software module, or combination thereof that is generally configured to manage some operations of the processing unit 104, and in particular some operations, including reset operations, of the processing portions 106 and 108. In some embodiments, when the processing unit 104 has multiple SMUs 122, each SMU 122 controls one processing portion 106 or 108.

In the example of FIG. 1, the processing system 100 implements a virtualized computing environment, wherein virtual machines (e.g., VMs 110, 112) are executed at the processor and the processing system 100 exposes physical resources of the system to different VMs as if the physical resources were dedicated physical devices accessed at the VM. For example, in some embodiments the processor 102 is generally configured to virtualize the processing unit 104, so that the physical resources of the processing unit 104 are concurrently employed by multiple VMs, but the physical resources appear to each of the multiple VMs as a physical processing unit dedicated to that VM. Furthermore, in at least some embodiments the processor 102 implements virtualization by spatially partitioning the hardware resources of the processing unit 104. In particular, the processing unit assigns the processing portions 106 and 108 to different virtual machines, so that each VM employs the hardware resources of the assigned processing portion independently of the other VMs.

To support virtualization, the processor 102 includes a host device driver 116 and a hypervisor 117. As understood by one skilled in the art, a host entity (e.g., a host device driver or hypervisor) refers to an entity controlled by the processor 102 to perform operations on behalf of multiple executing virtual machines. In contrast, a local entity (e.g., a local device driver 118) refers to an entity executed and controlled by an individual VM. The host entities thus control hardware resources of the processing system 100 directly and, at least in some cases, control those hardware resources in response to requests from multiple VMs.

The hypervisor 117 is a hardware unit, software module, or combination thereof configured to control different hardware resources of the processing system 100, and to provide an interface between those hardware resources and other modules of the processor 102. In particular, the hypervisor 117 is configured to control some reset operations at the hardware resources of the processing system 100, including some reset operations reset of the processing unit 104. For example, in some embodiments, the hypervisor 117 is configured to trigger a full reset of the processing unit 104 in response to detecting specified system conditions, such as the reset of a VM.

The host device driver 116 is a device driver executed at the processor 102 to provide an interface between modules (hardware or software) of the processor 102 and the processing unit 104. Thus, in at least some embodiments, the host device driver 116 is generally configured to receive communications (e.g., requests for specified operations) from modules of the processor 102, such as the local device driver 118 from VM 110. The host device driver 116 manages provision of those communications to the processing unit 104, including by translating those communications to a particular format expected by the processing unit 104, ensuring that the communications meet any timing or other communication requirements of the processing unit 104, and the like. The host device driver 116 also manages communications received from the processing unit 104 responsive to communications from the host device driver 116, including translating the received communications to formats expected by the modules of the processor 102.

To further support access to the hardware resources of the processing unit 104, the processor 102 implements a set of VFs, including VF 111 and VF 113. In response to initiating execution of a VM, the processor 102 assigns the VM a corresponding VF, so that each VF is uniquely assigned to a different VM. Thus, in the example of FIG. 1, the VF 111 is assigned to the VM 110, and the VF 113 is assigned to the VM 112.

Each VM employs the corresponding VF to access the hardware resources of the processing unit 104. In particular, as noted above, the processing system 100 virtualizes the hardware resources of the processing unit 104 so that each of the processing portions 106 and 108 are assigned to different VMs, and thus are spatially partitioned among the VMs. To support this spatial partitioning, the processor 102 assigns the VF for a VM to the corresponding processing portion, and the VM uses its assigned VF to interact with the corresponding processing portion. Thus, in the example of FIG. 1, the processor 102 assigns the VM 110 to the processing portion 106, and also assigns the VF 111 to the VM 110. Accordingly, the VM 110 uses the VF 111 to interact with the processing portion 106, and in particular to send graphics operations to the processing portion 106, and to receive any responsive data or control information. Similarly, the processor 102 assigns the VM 112 to the processing portion 108, and also assigns the VF 113 to the VM 112. Accordingly, the VM 112 uses the VF 113 to interact with the processing portion 108.

Because the processing portions 106 and 108 are spatially partitioned with respect to the VMs 110 and 112, each processing portion is able to be reset without impacting operations at the other portion. Accordingly, each of the VFs 111 and 113 are configured to send reset requests directly to the processing portions 106 and 108, respectively, in response to detecting one or more specified reset conditions. That is, in sending the reset requests, the VFs 111 and 113 bypass the host device driver 116 and the hypervisor 117, and therefore omit sending any interrupts or other communications to the host device driver 116 or hypervisor 117 to indicate the requested reset, nor do the VFs 111 and 113 rely on the host device driver 116 or the hypervisor 117 to trigger or control the requested reset. Because the host device driver 116 and the hypervisor 117 are bypassed, the overhead associated with the reset process is reduced, and isolation between the VMs 110 and 112 is enhanced. This increased isolation also improves security between the VFs 111 and 113 because, for example, a malicious VM is unable to employ reset requests to impact performance of another VM.

To illustrate the reset sequence, in some embodiments the VF 111 detects a stall at the processing portion 106 because, for example, the processing portion 106 has not sent an expected message or response to the local device driver 118 in a specified amount of time. In response to detecting that the processing portion 106 has stalled, the local device driver 118 prepares the VM 110 for the device reset and, upon completing the preparations (e.g., by notifying any software at the VM 110 of the reset) sends a message indicating to the VF 111 to proceed with the reset. Responsive to the message, the local device driver 118 sends a reset request to the local SMU 122 which executes a specified reset sequence on processing portion 106 in response to the reset request. Upon completing the reset sequence, the local SMU 122 sends a completion message to the local device driver 118. In response to the completion message, the local device driver notifies the OS running in the VM 110 that the reset is complete. Thus, the VF 111 handles the reset of the processing portion directly and bypasses the host device driver 116 and the hypervisor 117.

Figure 2:
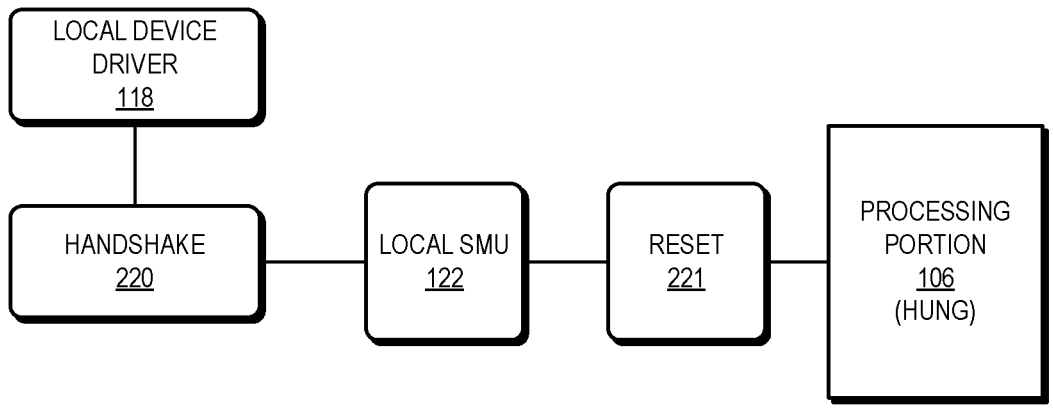
FIG. 2 is a block diagram of a virtual function of the processing system of FIG. 1 directly resetting the processing portion of the processing unit in accordance with some embodiments.

FIG. 2 is a block diagram of an example of directly resetting the processing portion 106 of the processing unit 104 in accordance with some embodiments. In the illustrated example, the processing portion 106 is in a stall condition or, in other words, the processing portion 106 is hung. In response to detecting the stall condition, the local device driver 118 seeks to reset the processing portion 106. Accordingly, the local device driver 118 performs a handshake 220 with the local SMU 122. For example, during the handshake 220 the local device driver 118 notifies the SMU 122 that the processing portion 106 needs to be reset. In response, the SMU 122 prepares the processing portion 106 for the reset.

Upon completing the preparations (e.g., by notifying any hardware at the processing portion 106 of the reset), the local SMU 122 sends a reset request 221 directly to the processing portion 106, bypassing the host device driver 116. Responsive to the reset request 221, the processing portion 106 executes a reset sequence indicated by the reset request 221. The reset sequence clears the stall condition at the processing portion 106, so that the processing portion 106 is no longer hung, and prepares the processing portion 106 to execute further operations. After the reset finishes, the local SMU 122 sends a message back to local device driver 118 to indicate the completion of the reset. Thus, the handshake 220 finishes. Accordingly, in the example of FIG. 2, the processing portion 106 is reset by the local SMU 122 directly. That is, the local SMU 122 does not employ virtualization resources of the processor 102, such as the host device driver 116 or the hypervisor 117 as intermediaries to perform the reset of the processing portion 106 and bypasses the host device driver 116 and the hypervisor 117, thus lowering the overhead associated with the reset process and improving overall processing efficiency at the processing system 100.

Figure 3:
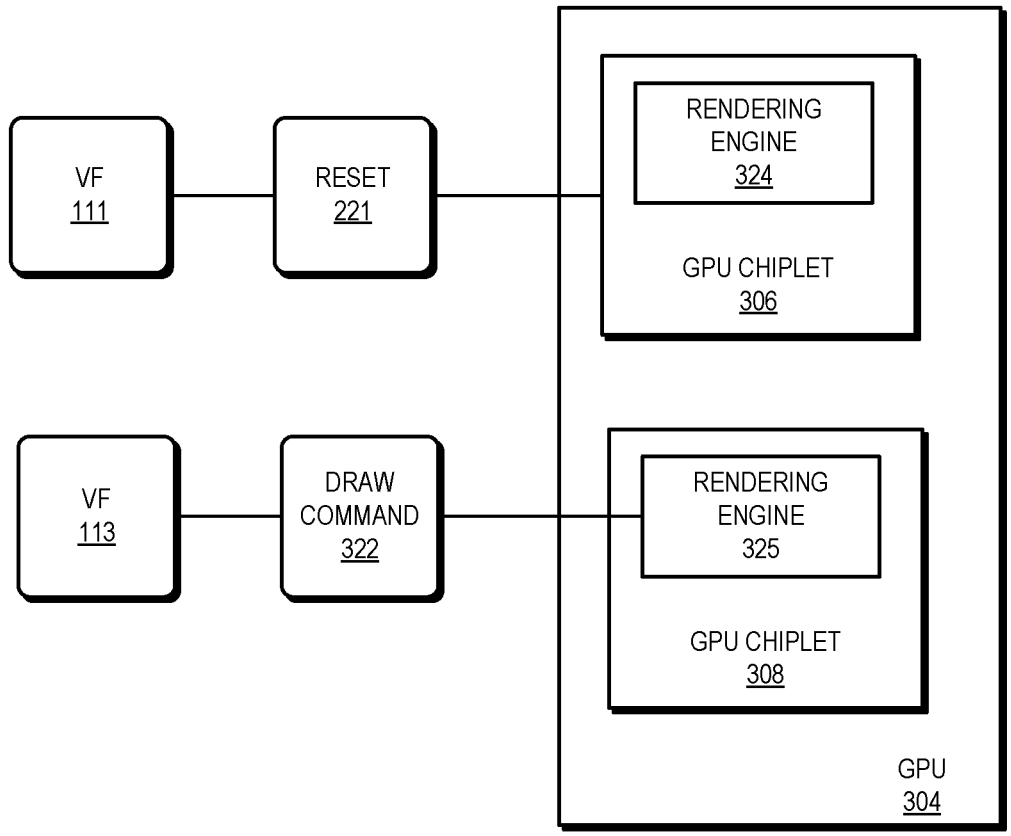
FIG. 3 is a block diagram illustrating an example of a virtual function resetting a rendering engine at a graphics processing unit chiplet in accordance with some embodiments.

As noted above, in some embodiments the processing unit 104 is a GPU and the processing portions 106 and 108 implement different rendering engines. An example is illustrated at FIG. 3 in accordance with some embodiments. In particular, FIG. 3 illustrates a GPU 304, corresponding to the processing unit 104 of FIG. 1. The GPU 304 includes GPU chiplets 306 and 308, corresponding to the processing portions 106 and 108, respectively.

In some embodiments, the GPU 304 is formed as a multi-chip module (e.g., a semiconductor die package) including two or more base integrated circuit dies communicably coupled together with bridge chip(s) such that the GPU 304 is usable (e.g., addressable) like a single semiconductor integrated circuit. Those skilled in the art will recognize that a conventional (e.g., not multi-chip) semiconductor integrated circuit is manufactured as a wafer or as a die (e.g., single-chip IC) formed in a wafer and later separated from the wafer (e.g., when the wafer is diced); multiple ICs are often manufactured in a wafer simultaneously. The ICs and possibly discrete circuits and possibly other components (such as non-semiconductor packaging substrates including printed circuit boards, interposers, and possibly others) are assembled in a multi-die processor.

In various embodiments, the GPU 304 includes one or more base IC dies employing processing stacked die chiplets in accordance with some embodiments. The base dies are formed as a single semiconductor chip package including N number of communicably coupled stacked die chiplets. For example, in the illustrated embodiment, the GPU 304 includes two chiplets, designated chiplets 306 and 308. It should be recognized that although various embodiments are described below in the particular context of GPU chiplets for ease of illustration and description, the concepts described here is also similarly applicable to other processors including accelerated processing units (APUs), discrete GPUs (dGPUs), artificial intelligence (AI) accelerators, other parallel processors, and the like. Further, in some embodiments, the GPU 304 is incorporated in the same semiconductor chip package as the processor 102, such that the processing system 100 is incorporated into a single semiconductor chip package.

In various embodiments, and as used herein, the term "chiplet" refers to any device including, but is not limited to, the following characteristics: 1) a chiplet includes an active silicon die containing at least a portion of the computational logic used to solve a full problem (i.e., the computational workload is distributed across multiples of these active silicon dies); 2) chiplets are packaged together as a monolithic unit on the same substrate; and 3) the programming model used to control a particular set of chiplets preserves the concept that the combination of these separate computational dies (e.g., the set of graphics processing stacked die chiplet) as a single monolithic unit. That is, each chiplet of a particular set is not exposed as a separate device to an application that uses the set of chiplets for processing computational workloads, but instead are exposed to the application so that the set of chiplets collectively appears as a unified processing unit, such as a graphics processing unit (GPU) or central processing unit (CPU). In various embodiments, the GPU 304 includes an inter-chip data fabric (not shown) that operates as a high-bandwidth die-to-die interconnect between chiplets. Additionally, in various embodiments, each of the chiplets 306 and 308 includes one or more levels of cache memory and one or more memory PHYs (not shown) for communicating with external system memory modules, such as dynamic random-access memory (DRAM) modules.

Each of the chiplets 306 and 308 implements a different rendering engine, designated rendering engines 325 and 324, respectively. Each of the rendering engines 324 and 325 is configured to execute received graphics commands (e.g., draw command 322). Further, each of the rendering engines 324 and 325 is configured to operate independently, or substantially independently, of the other rendering engine, and each of the rendering engines 324 and 325 is able to execute a reset sequence that does not impact operations at the other rendering engine. This allows each of the rendering engines 324 and 325 to be assigned to a different VF, and to execute graphics commands on behalf of the corresponding VM. The rendering engines 324 and 325 are thus spatially partitioned with respect to the VMs 110 and 112, and are thus able to be operated, and reset, by the VMS 110 and 112 independently.

To illustrate, in the example of FIG. 3, the VF 111 is assigned to the rendering engine 324, and the VF 113 is assigned to the rendering engine 325. In response to a stall at the rendering engine 324, the VF 111 directly resets the rendering engine 324 in similar fashion to that described with respect to FIG. 2. In particular, in response to detecting the stall at the rendering engine 324, the local device driver 118 conducts the handshake 220 with the local SMU 122, and upon completing the handshake 220 sends the reset request 221 to the rendering engine 324. In response to the reset request 221, the rendering engine 324 executes a specified reset sequence, thus clearing the stall condition and preparing the rendering engine 324 to execute additional graphics commands.

Concurrent with the VF 111 directly resetting the rendering engine 324, the VF 113 sends the rendering engine 325 a draw command 322 that was generated by the VM 112. In response to the draw command 322, the rendering engine 325 executes a set of operations indicated by the command. In at least some embodiments, the rendering engine 325 executes these commands concurrent with the rendering engine 324 executing the reset sequence in response to the reset request 221. Thus, in the example of FIG. 3, the rendering engine 324 is reset independent of and concurrent with the rendering engine 325 executing the draw command 322.

Figure 4:
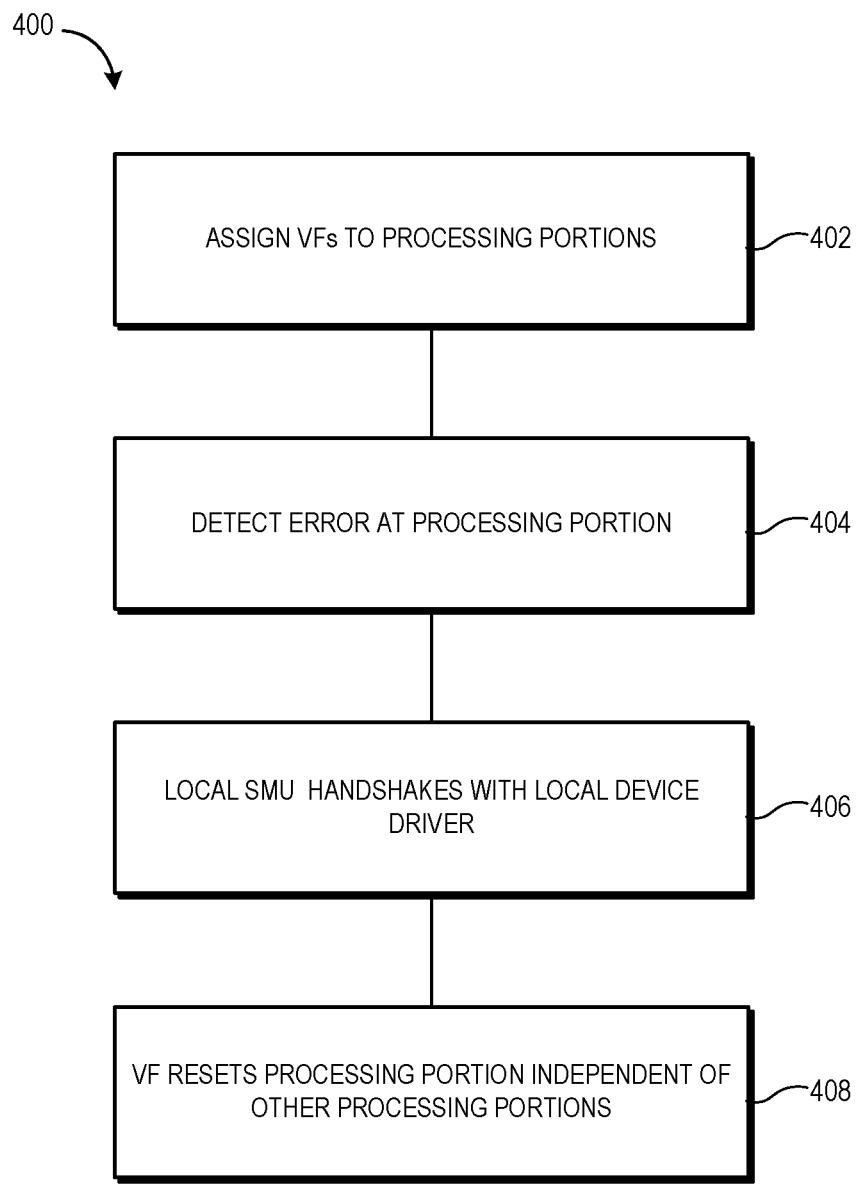
FIG. 4 is a flow diagram of a method of a virtual function directly resetting a processing portion of a processing unit in accordance with some embodiments.

FIG. 4 illustrates a flow diagram of a method 400 of a virtual function directly resetting a processing portion of a processing unit in accordance with some embodiments. The method 400 is described with respect to an example implementation at the processing system 100 of FIG. 1. However, it will be appreciated that, in other embodiments, the method 400 is implemented at processing systems having different configurations than the configuration of processing system 100.

At block 402, the host device driver 116 assigns the VFs 111 and 113, for the VMs 110 and 112, respectively, to the processing portions 106 and 108. At block 404, the local device driver 118 detects an error at the processing portion 106, such as an indication that the processing portion 106 has stalled. In response, at block 406, the local device driver 118 executes the handshake 220 with the local SMU 122. At block 408, upon completion of the handshake 220 the local SMU 122 sends the reset request 221 to the processing portion 106, thus directly resetting the processing portion 106 independent of the processing portion 108 and bypassing the device driver 116.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   detecting a reset condition at a virtual function of a virtual machine executing at a processing system; and
   in response to detecting the reset condition, a local system management unit (SMU) of a processing unit initiating a reset sequence for a processing portion of the processing unit associated with the virtual function, the initiating bypassing a host driver of the processing system.

2. The method of claim 1, wherein the reset sequence includes a handshake between the local SMU and a device driver of the virtual machine.

3. The method of claim 1, wherein the initiating bypasses a hypervisor of the processing system.

4. The method of claim 1, wherein the processing unit comprises a plurality of semiconductor dies, and wherein the processing portion of the processing unit comprises one of the plurality of semiconductor dies.

5. The method of claim 1, wherein the processing unit is spatially partitioned into a plurality of processing portions comprising the processing portion.

6. The method of claim 4, wherein the reset sequence comprises a reset sequence to reset the one of the plurality of semiconductor dies independent of resetting other semiconductor dies of the plurality of semiconductor dies.

7. The method of claim 5, wherein each of the plurality of processing portions is assigned to a different one of a plurality of virtual functions comprising the virtual function.

8. A non-transitory computer readable medium tangibly embodying a set of instructions to manipulate a processor, the instructions comprising instructions to:
   in response to detecting a reset condition at a virtual function of a virtual machine, initiate a reset sequence for a processing portion of a processing unit; and
   responsive to initiating the reset sequence, execute a handshake between a local system management unit (SMU) of the processing unit and a local device driver of the virtual machine.

9. The non-transitory computer readable medium of claim 8, wherein the reset sequence omits a handshake between the virtual function and a host driver of a processing system.

10. The non-transitory computer readable medium of claim 8, wherein the processing unit comprises a graphics processing unit (GPU).

11. The non-transitory computer readable medium of claim 8, wherein the reset condition comprises a detected error at the processing portion of the processing unit.

12. The non-transitory computer readable medium of claim 10, wherein the GPU comprises a plurality of GPU chiplets, and wherein the processing portion corresponds to one of the plurality of GPU chiplets.

13. The non-transitory computer readable medium of claim 12, wherein the processing portion comprises a render engine assigned to the virtual machine.

14. A processing system, comprising:
    a processing unit; and
    a processor to execute a virtual machine and a virtual function associated with the virtual machine, wherein in response to detecting a reset condition, a local system management unit (SMU) of the processing unit initiates a reset sequence for a processing portion of the processing unit associated with the virtual function, the reset sequence bypassing a host driver of the processing system.

15. The processing system of claim 14, wherein the reset sequence includes a handshake between the local SMU and a device driver of the virtual machine.

16. The processing system of claim 14, wherein the processing unit comprises a plurality of semiconductor dies, and wherein the processing portion of the processing unit comprises one of the plurality of semiconductor dies.

17. The processing system of claim 14, wherein the processing unit is spatially partitioned into a plurality of processing portions.

18. The processing system of claim 15, wherein the reset sequence bypasses a hypervisor of the processing system.

19. The processing system of claim 16, wherein the reset sequence comprises a reset sequence to reset the one of the plurality of semiconductor dies independent of other semiconductor dies of the plurality of semiconductor dies.

20. The processing system of claim 17, wherein each of the plurality of processing portions is assigned to a different one of a plurality of virtual functions.

* * * * *